Oct. 10, 1961  L. R. WICHERS  3,003,826
SLIDE WITH SPRING-SUPPORTED TRACK
Filed Aug. 22, 1960
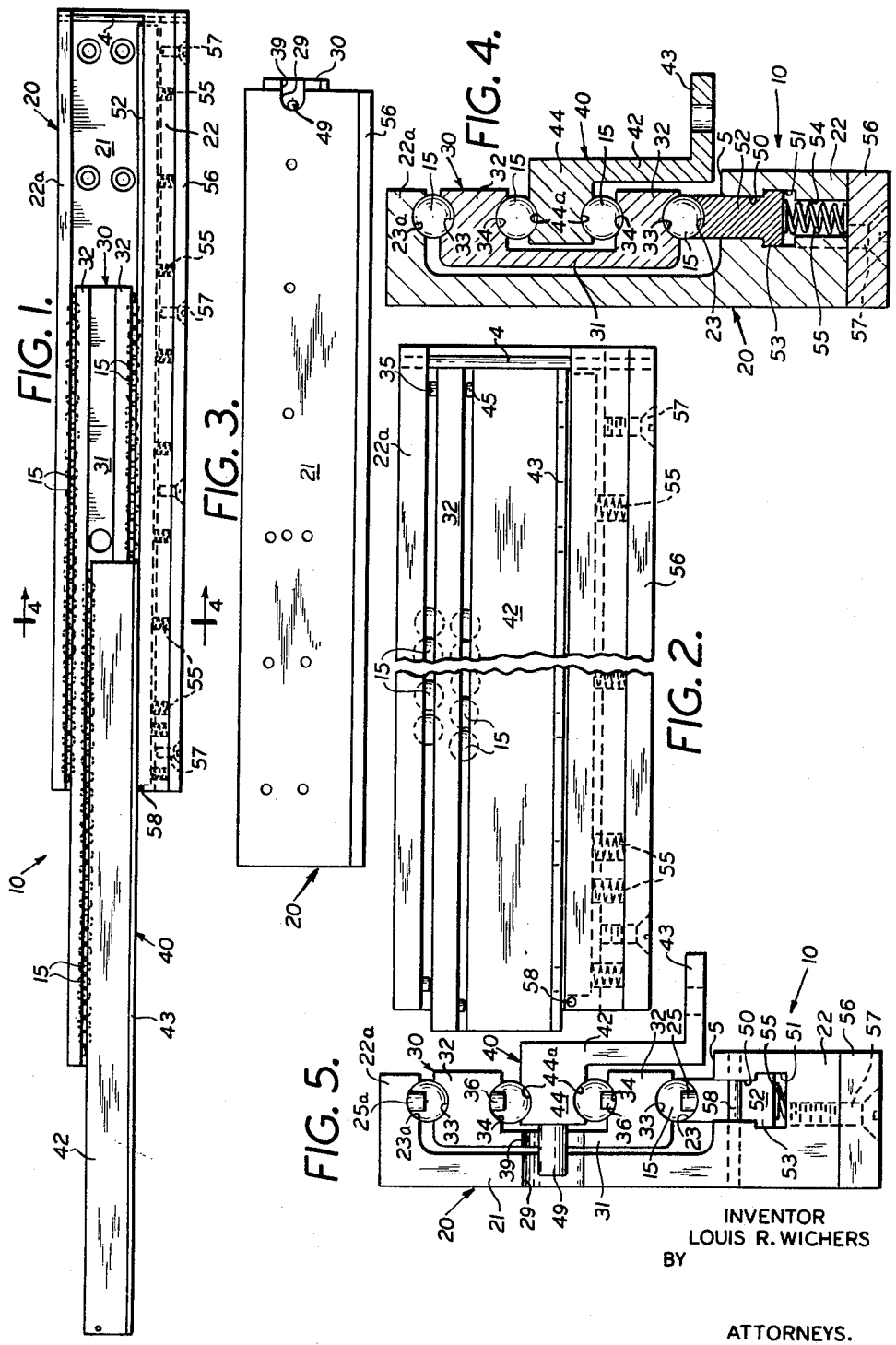
INVENTOR
LOUIS R. WICHERS
BY
ATTORNEYS.

United States Patent Office 3,003,826
Patented Oct. 10, 1961

3,003,826
SLIDE WITH SPRING-SUPPORTED TRACK
Louis R. Wichers, Nyack, N.Y., assignor to Grant Pulley and Hardware Corporation, West Nyack, N.Y., a corporation of New York
Filed Aug. 22, 1960, Ser. No. 51,233
2 Claims. (Cl. 308—3.8)

This invention relates to drawer slides of the type having two or more slide elements relatively movable longitudinally on anti-friction bearing means disposed between cooperating or mating track surfaces on the elements. More particularly, the invention relates to novel means for reducing scoring or indenting of the track surfaces by the balls under conditions of severe acceleration or deceleration of the slide.

Without limitation thereto, the invention is applicable for use in aircraft, for example, which are subject to high forces of acceleration or deceleration whether from speed changes, firing of missiles, etc. Slides are commonly used in such aircraft for support of electronic equipment and the like and it is extremely important that the slides work smoothly, without binding or undue play, over a long period of time.

In slides with balls forming the anti-friction bearing means between the elements, when the slide is subjected to extreme acceleration or deceleration, there is a differential force of acceleration on the slide element fixed to the aircraft and the relatively movable slide element, so that the balls tend to indent or score the ball tracks or raceways particularly when the slide elements are of a relatively lightweight and softer metal such as aluminum and some of its alloys.

An important object of this invention is to provide a slide of the above-described type with simple means for preventing scoring of the track surfaces under severe conditions of acceleration and deceleration.

In accordance with a preferred embodiment of the invention, the invention is utilized in conjunction with a slide having at least a longitudinally extending support element and a second element movable longitudinally relative to said support element by means of balls disposed between said elements. In accordance with prior practice, the support element has had first and second longitudinal flanges formed with track surfaces; and the second element has had track surfaces facing said first-mentioned track surfaces, with the balls seated in said track surfaces. As an important feature of the invention, said first flange does not engage the balls. Instead, said first flange has a longitudinal slot, and a longitudinally extending bar received within said slot and transversely slidable therein. Said bar has one of said first-mentioned track surfaces for engaging the balls. Stiff spring means in the slot engage the bar and urge it outwardly.

By way of example, the slide may be designed to support a load on the order of magnitude of 200 pounds. Under normal conditions, the spring means do not deflect under this load, and the slide is under selected desired tension. Under conditions of acceleration or deceleration (which, of course, are transient), the spring means deflect under the shock of the differential forces of acceleration of the fixed and movable slide elements, permitting relative transverse movement of the slide elements and thereby momentarily releasing the tension on the balls before the balls can score the track surfaces. Stop means are provided to limit the relative transverse movement of the slide elements.

As important advantages of the invention, it can be used in conjunction with slides of varying types, with only slight modifications thereof, and is economical and convenient to manufacture.

Other objects and advantages of the invention will become apparent from the following description, in conjunction with the annexed drawing, in which preferred embodiments of the invention are disclosed.

In the drawings,

FIG. 1 is an inside elevation of a slide incorporating the invention, in extended or open position.

FIG. 2 is a broken away view similar to FIG. 1, with the slide closed or retracted, and is drawn to enlarged scale.

FIG. 3 is an outside elevation of the slide.

FIG. 4 is a section on line 4—4 of FIG. 1, drawn to still further enlarged scale.

FIG. 5 is an end elevation of the slide, drawn to the same scale as FIG. 4.

While the invention is not limited to use in conjunction with any specific slide, the invention is shown and described illustratively as applied to a slide 10 of the general type disclosed in U.S. patent to Gussack No. 2,926,048, and also disclosed in other patents. For convenience, only one slide, which may be the lefthand slide, is shown, there being customarily a pair of complementary slides for supporting equipment.

Said slide 10 is longitudinally elongated and comprises laterally outer support element 20, intermediate support element 30 and laterally inner support element 40. Said outer support element 20 is adapted to be fixed in place, for instance, to the frame of an airplane. Support elements 30 and 40 are longitudinally slidable; and inner support element 40, for instance, may be fixed to an equipment drawer. The invention is applicable to any drawer slide of the type having two or more slide elements relatively movable longitudinally on anti-friction bearing means disposed between cooperating or mating track surfaces on the elements, with one element being fixed to a frame subject to acceleration and deceleration and the other element being fixed to an equipment drawer or the like.

Outer member 20 is channel-shaped and has a vertically and longitudinally extending web 21, as well as parallel horizontally and longitudinally extending top and bottom flanges 22a and 22. These flanges 22a and 22 extend inwardly from web 21. An arcuate cross-section, longitudinally extending track surface 23a is formed in the lower face of flange 22a.

Flange 22 is quite thick in the vertical direction. In accordance with the invention, flange 22 has a vertically and longitudinally extending slot 50 extending from the upper face thereof approximately half-way to the bottom surface thereof. Said slot 50 is cross-sectionally of inverted T-shape, as its lower portion 51 is of increased width.

Bar 52 is longitudinally elongated and extends vertically slidably into slot 50. Bar 52 protrudes above the upper face of flange 22. Bar 52 is cross-sectionally of inverted T-shape, as its lower portion 53 is of increased width to correspond to the increased width of lower slot portion 51. The height of bar portion 53 is less than the height of slot portion 51. Pin 58 and bar 4 respectively in the front and rear ends of slot portion 51 prevent longitudinal movement of bar 52. Bar 52 is slidable towards and away from an upper limit position in which the upper surface of bar portion 53 strikes the upper surface of slot portion 51. An arcuate cross-section, longitudinally extending track surface 23 is formed in the upper surface of bar 52 and opposes track surface 23a.

Flange 22 has a plurality of longitudinally spaced, vertically extending bores 54 which extend between the lower surface of slot portion 51 and the lower face of flange 22. A vertically extending compression coil spring 55 is located in each bore 54. A longitudinally extending retaining plate 56 is fixed to the lower face of flange 22 so as to block the lower ends of bores 54. Flat head screws 57 extend through countersunk bores in plate 56 and into appropriately screw-threaded bores in flange 22, to hold plate 56 in place.

Under normal rated load conditions of slide 10, springs 55 extend under tension between plate 56 and bar 52 and maintain bar 52 in its upper limit position.

Intermediate element 30 is also channel-shaped and has a vertical web 31 and inwardly extending horizontal flanges 32. Flanges 32 have longitudinally extending arcuate cross-section track surfaces 33 respectively facing track surfaces 23 and 23a and longitudinally extending arcuate cross-section track surfaces 34 along their proximate horizontal faces. Element 30 is movable longitudinally of element 20 on balls 15 engaged in track surfaces 23 and 33 and also in track surfaces 23a and 33. While ball spacers may be used, they are not shown and may be omitted because of the use of the spring-biased bar 52 for prevention of scoring of the track surfaces. Stop pins 25a and 25, respectively on flanges 22a and bar 52, in cooperation with stop pins 35 on flanges 32, retain the balls in their tracks, and also limit the forward extension of element 30 relative to element 20 (FIG. 1).

Inner or equipment mounting element 40 is generally Z-shaped and comprises relatively massive, substantially square cross-section flange 44, web 42 extending downwardly from the inner end of flange 44 and lower inwardly projecting equipment supporting flange 43. The upper and lower horizontal surfaces of flange 44 are formed with longitudinally extending, arcuate cross-section track surfaces 44a aligned with track surfaces 34.

Element 40 is movable longitudinally of element 30 on further balls 15 engaged in each set of facing track surfaces 34 and 44a. Ball spacers may be omitted, similarly as in the case of the mounting of elements 20 and 30. Stop pins 36 on flanges 32, in cooperation with stop pins 45 on flange 44, retain the balls in their tracks, and also limit the forward extension of element 40 relative to element 30 (FIG. 1).

In order to control rearward movement of elements 30 and 40, pin 49 projects laterally outwardly from the outer side of flange 44. This registers with notches 39 and 29 respectively formed in the front ends of flanges 31 and 21 and extending across the width thereof. In rearward movement of element 40, relative to elements 30, pin 49 is received in notch 39. Upon continued rearward movement of elements 40 and 30, pin 49 is received in notch 29. Vertical bar 4 extended through flanges 22 and 22a, at the rear thereof stops further rearward movement of flanges 32.

As an important feature of the invention, positive means are provided for limiting downward movement of element 40, against the action of springs 55. Flange 22 extends laterally inwardly of flange 32. Web 42 extends outwardly of the inner surface of flange 22. Hence, flange 43 is in partial vertical registration with the upper surface 5 of flange 22, which serves as a stop shoulder to limit downward movement of element 40. The distance between flange 43 and shoulder 5 is less than the distance between bar portion 53 and slot portion 51 in the upper limit position of bar portion 53.

In normal operation, the slide assembly operates conventionally. With bar 52 in its upper limit position, the clearances are the usual ones and the elements slide smoothly. In the event of a large acceleration (or deceleration) the shock from the resulting tendency of elements 30 and 40 to accelerate differently from element 20 is taken up by springs 55, which are compressed by bar 52, relieving the tension of the assembly before balls 15 can score the track surfaces. When the acceleration (or deceleration) ceases, the springs return to their normal condition, and slide 10 can be operated as usual. In the event of a severe shock, downward transverse movement of element 40 relative to element 20 is limited by engagement of flange 43 against shoulder 5. The transverse movement of the elements is sufficiently limited to prevent dislodgement of the balls from the tracks.

The number and position of springs depend upon operating conditions. As shown in FIG. 1, there are preferably more springs at the front of element 20, to support the equipment properly when elements 30 and 40 are drawn forwardly.

The drawings are substantially to scale of a working model and reference is made to the drawings to complete the disclosure herein. In said working model, the springs were of tempered hardened carbon spring wire, known as "music wire." The wire was 0.050 inch in diameter. The outside diameter of the springs was 3/16 inch. There were ten springs, spaced as shown in FIG. 1. A full complement of balls, without spacers, was used. The springs did not deflect under the normal rated load of 200 pounds per pair of slides even when they were fully extended. In tests, the slide was subjected to momentary shocks corresponding to an acceleration of 120 g, the equivalent of subjecting the pair of slides to a momentary weight of 24,000 pounds, plus the full range of shocks as called for in Mil–S 901 B (Navy), a specification issued by the United States Government. There was almost no denting of the track surfaces by the balls, and the slide continued to operate satisfactorily. There was no twisting of bar 52 relative to flange 22.

While the use of coil springs is preferred, flat springs or other suitable springs may be used.

While there has been disclosed a preferred embodiment of the invention and various changes, omissions and additions have been indicated, it will be apparent that various other changes, omissions and additions may be made without departing from the scope and spirit thereof.

What is claimed is:

1. A slide comprising a longitudinally extending, laterally outer, fixed support element of channel shape having a vertical web and inwardly extending upper and lower fixed element flanges, said lower flange having a longitudinally and vertically extending slot extending to the upper surface thereof and having a lower portion of increased width, a longitudinally extending bar received vertically slidably within said slot, said bar having a lower portion of increased width but of less height than said slot lower portion and abutting the upper surface of said slot lower portion in the upper limit position of said bar, spring means in said slot engaging said bar and urging it upwardly and maintaining it in its upper limit position under normal load conditions of said bar, the upper surface of said bar and lower surface of said upper flange being formed with longitudinally extending track surfaces, at least one additional support element, said additional support element being arranged in lateral succession inwardly of said fixed element and being independently longitudinally slidable, the support element next in succession to said fixed element having track surfaces facing said first-mentioned track surfaces, balls seated in said track surfaces, and means mounting successive additional support elements longitudinally slidably relative to each other, said spring means being adapted to be flexed to permit downward movement of said bar under momentary abnormally increased load conditions to prevent said balls from scoring said track surfaces, said fixed element lower flange having a stop shoulder positioned and adapted to be engaged by the innermost additional element to stop the downward movement of said additional elements.

2. A slide comprising a longitudinally extending, laterally outer fixed support element of channel shape having a vertical web and inwardly extending upper and lower fixed element flanges, said lower flange having a longitudinally and vertically extending slot extending to the upper surface thereof and having a lower portion of reduced width, a longitudinally extending bar received vertically slidably within said slot, said bar having a lower portion of increased width but of less height than said slot lower portion and abutting the upper surface of said slot lower portion in the upper limit position of said bar, said lower flange having a plurality of longitudinally extending bores extending between the bottom of said slot and the bottom of said lower flange, compression springs in said bores, a retainer plate on the bottom of said lower flange blocking said bores, said springs extending under tension between said plate and said bar and urging it upwardly and maintaining it in its upper limit position under normal load conditions of said bar, the upper surface of said bar and lower surface of said upper flange being formed with longitudinally extending track surfaces, a laterally intermediate support element movable longitudinally relative to said fixed element, said intermediate element having an intermediate element vertical web and inwardly extending upper and lower intermediate element flanges opposing said fixed element flanges, said intermediate element flanges having intermediate element track surfaces facing said fixed element track surfaces, balls disposed between said flanges and seated in said track surfaces, a laterally inner equipment support element movable longitudinally relative to said intermediate element and having an equipment element upper flange disposed between said intermediate element flanges, said equipment element flange and said intermediate element flanges respectively having further facing track surfaces and further balls disposed between said intermediate element and said equipment element and seated in said further track surfaces, said equipment element having an equipment element vertical web depending from the inner edge of said equipment element upper flange and having an equipment element lower flange extending inwardly from said equipment element vertical web, said spring means being adapted to be flexed to permit downward movement of said bar under momentary abnormally increased load conditions to prevent said balls from scoring said track surfaces, said fixed element lower flange having a stop shoulder positioned and adapted to be engaged by said equipment element lower flange to stop the downward movement of said intermediate and equipment elements.

References Cited in the file of this patent

UNITED STATES PATENTS

| | | |
|---|---|---|
| 2,629,972 | Garrison | Mar. 3, 1953 |
| 2,926,048 | Gussack | Feb. 23, 1960 |
| 2,929,661 | Brown | Mar. 22, 1960 |